US012656649B2

(12) United States Patent
Yao et al.

(10) Patent No.: US 12,656,649 B2
(45) Date of Patent: Jun. 16, 2026

(54) DISPLAY SUBSTRATE AND MANUFACTURING METHOD THEREFOR, DISPLAY PANEL, AND DISPLAY APPARATUS

(71) Applicants: Ordos Yuansheng Optoelectronics Co., Ltd., Ordos (CN); BOE Technology Group Co., Ltd., Beijing (CN)

(72) Inventors: Lei Yao, Beijing (CN); Yongqiang Zhang, Beijing (CN); Haoyi Xin, Beijing (CN); Jingyi Xu, Beijing (CN); Feng Li, Beijing (CN); Yanfeng Li, Beijing (CN)

(73) Assignees: Ordos Yuansheng Optoelectronics Co., Ltd., Ordos (CN); BOE Technology Group Co., Ltd., Beijing (CN)

( * ) Notice: Subject to any disclaimer, the term of this patent is extended or adjusted under 35 U.S.C. 154(b) by 99 days.

(21) Appl. No.: 18/704,425

(22) PCT Filed: Dec. 24, 2021

(86) PCT No.: PCT/CN2021/141057
§ 371 (c)(1),
(2) Date: Oct. 14, 2024

(87) PCT Pub. No.: WO2023/115507
PCT Pub. Date: Jun. 29, 2023

(65) Prior Publication Data
US 2025/0035997 A1 Jan. 30, 2025

(51) Int. Cl.
*G02F 1/1362* (2006.01)
*G02F 1/1368* (2006.01)

(52) U.S. Cl.
CPC .. *G02F 1/136295* (2021.01); *G02F 1/136209* (2013.01); *G02F 1/1368* (2013.01)

(58) Field of Classification Search
CPC ......... G02F 1/136295; G02F 1/136209; G02F 1/1368
See application file for complete search history.

(56) References Cited

U.S. PATENT DOCUMENTS 6,388,721 B1 * 5/2002 Murade ............. G02F 1/136209
349/110
2016/0282665 A1 9/2016 Jang et al.
2019/0214442 A1 * 7/2019 Liu ...................... H10K 71/135

FOREIGN PATENT DOCUMENTS

CN 104834139 A 8/2015
CN 105355632 A 2/2016
(Continued)

OTHER PUBLICATIONS

Yuan, G., Z. Xu, and F. Zhang. "Fabrication of ITO film and influence to electroluminescent devices through RTA disposing." Journal of Optoelectronics Laser 18.8 (2007): 903.
(Continued)

*Primary Examiner* — Lucy P Chien
(74) *Attorney, Agent, or Firm* — IPro, PLLC

(57) ABSTRACT

A display substrate includes: a first base substrate; scanning lines at a side of the first base substrate, extending in a first direction and arranged in a second direction; data lines at the same side of the first base substrate as the scanning lines and in a different layer from the scanning lines, extending in the second direction and arranged in the first direction; a common electrode layer at a side of the scanning lines and the data lines facing away from the first base substrate; and a first light shielding layer in contact with the common electrode layer, and including first light shielding portions extending in the second direction. The first direction inter-
(Continued)

sects with the second direction. The first light shielding portions are in areas between adjacent sub-pixels in the first direction.

14 Claims, 8 Drawing Sheets

(56) References Cited

FOREIGN PATENT DOCUMENTS

| CN | 106200169 | A | | 12/2016 | | |
| CN | 107632453 | A | | 1/2018 | | |
| CN | 108681146 | A | * | 10/2018 | ....... | G02F 1/133512 |
| CN | 109270720 | A | | 1/2019 | | |
| CN | 111025840 | A | | 4/2020 | | |
| CN | 111367128 | A | | 7/2020 | | |
| CN | 113156651 | A | | 7/2021 | | |
| KR | 20090069633 | A | | 7/2009 | | |
| KR | 20090112112 | A | | 10/2009 | | |
| KR | 20190111689 | A | | 10/2019 | | |

OTHER PUBLICATIONS

Jiang, X. S., D. S. Wan, and X. P. Song. "Effect of annealing temperature on the microstructure and photoelectrical properties of ITO films." Journal of Synthetic Crystals 40.6 (2011): 1536-1540.
An, H., and BB Cao. "Influence of ITO anneal on the transmittance property of HADS TFT-LCD." Chinese Journal of Liquid Crystals and Displays 34.5 (2019): 482-488.
CN 202180004187.0 first office action dated Nov. 21, 2024.
PCT/CN2021/141057 international search report dated Sep. 27, 2022.

* cited by examiner

DISPLAY SUBSTRATE AND MANUFACTURING METHOD THEREFOR, DISPLAY PANEL, AND DISPLAY APPARATUS

CROSS REFERENCE TO RELATED APPLICATION

This application is a National Stage of International Application No. PCT/CN2021/141057 filed Dec. 24, 2021, the entire contents of which are incorporated herein by reference.

TECHNICAL FIELD

The disclosure relates to the field of display technology, and in particular, to a display substrate and a manufacturing method therefor, a display panel and a display apparatus.

BACKGROUND

The Liquid Crystal Display (LCD) has attracted much attention in the industry due to the advantages such as small volume, low power consumption, no radiation, etc. Since the LCD has the above-mentioned advantages, most of the current virtual reality products with high pixel density (PPI) use the LCD technology. In order to provide a better immersive experience and reduce the screen door effect in use of VR, the PPI of the virtual reality product is continuously increased. While the PPI is continuously increased, the pixel pitch of the display product is also continuously compressed, and correspondingly, the size of the black matrix is also compressed. Affected by the process capability of the alignment device, when the alignment of the array substrate and the opposite substrate fluctuates, the black matrix cannot effectively block the light leakage between adjacent pixels, leading to color cross in the product, affecting the display effect and affecting the user experience.

SUMMARY

Embodiments of the disclosure provide a display substrate, including:
a first base substrate;
a plurality of scanning lines at a side of the first base substrate, extending in a first direction and arranged in a second direction; where the first direction intersects with the second direction;
a plurality of data lines at the side of the first base substrate same as the scanning lines and in a different layer from the scanning lines, extending in the second direction and arranged in the first direction; where the plurality of scanning lines and the plurality of data lines define a plurality of sub-pixels;
a common electrode layer at a side of the scanning lines and the data lines facing away from the first base substrate; and
a first light shielding layer in contact with the common electrode layer, including a plurality of first light shielding portions extending in the second direction; where the first light shielding portions are in areas between the sub-pixels adjacent in the first direction.

In some embodiments, orthographic projections of the data lines on the first base substrate are within orthographic projections of the first light shielding portions on the first base substrate.

In some embodiments, the common electrode layer is at a side of the first light shielding portions facing away from the first base substrate; and
orthographic projections of the first light shielding portions on the first base substrate are within an orthographic projection of the common electrode layer on the first base substrate, and the common electrode layer covers lateral surfaces of the first light shielding portions.

In some embodiments, the first light shielding portions are at a side of the common electrode layer facing away from the first base substrate; and an orthographic projection of the common electrode layer on the first base substrate and an orthographic projection of the first light shielding portion on the first base substrate have a substantially overlapping area.

In some embodiments, the common electrode layer includes: groove groups corresponding to the sub-pixels one by one; and the groove group includes at least one groove extending in the second direction and penetrating through a thickness of the common electrode layer; and
the orthographic projections of the first light shielding portions on the first base substrate do not overlap with orthographic projections of the grooves on the first base substrate.

In some embodiments, the groove group includes a plurality of grooves when the first light shielding portions are at the side of the common electrode layer facing away from the first base substrate.

In some embodiments, the groove group includes only one groove when the common electrode layer is at the side of the first light shielding portions facing away from the first base substrate.

In some embodiments, a thickness of the first light shielding layer is greater than or equal to 300 angstroms and less than or equal to 1000 angstroms.

In some embodiments, material of the first light shielding layer includes molybdenum.

In some embodiments, the first light shielding layer further includes a plurality of second light shielding portions extending in the first direction; and the second light shielding portions are between the sub-pixels adjacent in the second direction.

In some embodiments, the display substrate further includes:
a pixel electrode layer between the common electrode layer and the data lines; where orthographic projections of the first light shielding portions on the first base substrate do not overlap with an orthographic projection of the pixel electrode layer on the first base substrate.

In some embodiments, the data lines are at a side of the scanning lines facing away from the first base substrate; and
one of the sub-pixels includes a thin film transistor; a gate electrode of the thin film transistor is arranged in a same layer as one of the scanning lines and electrically connected to one of the scanning lines; a source electrode of the thin film transistor is arranged in a same layer as one of the data lines and electrically connected to one of the data lines; and a drain electrode of the thin film transistor is located at a side of the source electrode facing away from the first base substrate.

Embodiments of the disclosure provide a manufacturing method for a display substrate, including:
forming a pattern of a plurality of scanning lines and a pattern of a plurality of data lines at a side of a first base substrate; where the plurality of scanning lines extend in a first direction and are arranged in a second direction; the plurality of data lines extend in the second direction and are arranged in the first direction; the first direction intersects with the second direction; the plurality of scanning lines and the plurality of data lines define a plurality of sub-pixels; and forming patterns of a common electrode layer and a first light shielding layer at a side of the plurality of data lines and the plurality of scanning lines facing away from the first base substrate; where the first light shielding layer is in contact with the common electrode layer, the first light shielding layer includes a plurality of first light shielding portions extending in the second direction, and the first light shielding portions are in areas between the sub-pixels adjacent in the first direction.

In some embodiments, forming the patterns of the common electrode layer and the first light shielding layer at the side of the plurality of data lines and the plurality of scanning lines facing away from the first base substrate, includes:

forming the common electrode layer at the side of the plurality of data lines and the plurality of scanning lines facing away from the first base substrate;

forming the first light shielding layer at a side of the common electrode layer facing away from the pixel electrode layer;

processing the first light shielding layer and the common electrode layer by a patterning process to form a pattern of the first light shielding layer and a pattern of the common electrode layer.

In some embodiments, processing the first light shielding layer and the common electrode layer by the patterning process to form the pattern of the first light shielding layer and the pattern of the common electrode layer, includes:

coating photoresist at a side of the first light shielding layer facing away from the common electrode layer, and forming a first pattern by exposure and development processes;

forming a second pattern corresponding to the first pattern on the first light shielding layer and the common electrode layer by an etching process;

peeling off the photoresist, and annealing the common electrode layer to crystallize the common electrode layer;

forming photoresist at a side of the first light shielding layer facing away from the common electrode layer, and forming a third pattern by exposure and development processes; where the third pattern covers a part of the first light shielding layer;

removing the first light shielding layer that is not covered by the third pattern by an etching process; and removing the photoresist.

In some embodiments, forming the patterns of the common electrode layer and the first light shielding layer at the side of the plurality of data lines and the plurality of scanning lines facing away from the first base substrate, includes:

forming the first light shielding layer at the side of the plurality of data lines and the plurality of scanning lines facing away from the first base substrate, and forming a pattern of the first light shielding portions by a patterning process; and forming the common electrode layer at a side of the first light shielding layer facing away from the plurality of data lines and the plurality of scanning lines, and forming a pattern of the common electrode layer by a patterning process.

Embodiments of the disclosure provide a display panel, including:

the display substrate provided by the embodiments of the disclosure;

an opposite substrate arranged opposite to the display substrate, including a second light shielding layer; where the second light shielding layer includes a plurality of opening areas, and an orthographic projection of the first light shielding layer on the first base substrate is within an orthographic projection of the second light shielding layer on the first base substrate; and a liquid crystal layer between the opposite substrate and the display substrate.

Embodiments of the disclosure provide a display apparatus, including the display panel provided by the embodiment of the disclosure.

BRIEF DESCRIPTION OF FIGURES

In order to illustrate the technical solutions in the embodiments of the disclosure more clearly, the accompanying figures which need to be used in describing the embodiments will be introduced below briefly. Obviously the accompanying figures described below are only some embodiments of the disclosure, and other accompanying figures can also be obtained by those ordinary skilled in the art according to these accompanying figures without creative labor.

DETAILED DESCRIPTION

In order to make the purposes, technical solutions and advantages of the disclosure clearer, the technical solutions of the embodiments of the disclosure will be described clearly and completely below in combination with the accompanying figures of the embodiments of the disclosure. Obviously the described embodiments are a part of the embodiments of the disclosure but not all the embodiments. Also in the case of no conflict, the embodiments and the features therein in the disclosure can be combined with each other. Based upon the embodiments of the disclosure, all of other embodiments obtained by those ordinary skilled in the art without creative work pertain to the protection scope of the disclosure.

Unless otherwise defined, the technical or scientific terms used in the disclosure shall have the general meaning understood by those ordinary skilled in the art to which the disclosure belongs. The "first", "second" and similar words used in the disclosure do not represent any order, quantity or importance, and are only used to distinguish different components. The word such as "include" or "contain" or the like means that the element or object appearing before this word encompasses the elements or objects and their equivalents listed after this word, without excluding other elements or objects. The word such as "connect" or "connected" or the like is not limited to the physical or mechanical connection, but can include the electrical connection, whether direct or indirect.

It is necessary to note that the size and shape of each diagram in the accompanying figures do not reflect the true proportion, and are merely for purpose of schematically illustrating the content of the disclosure. Also, the same or similar reference numbers represent the same or similar elements or the elements having the same or similar functions all the way.

Figure 1:
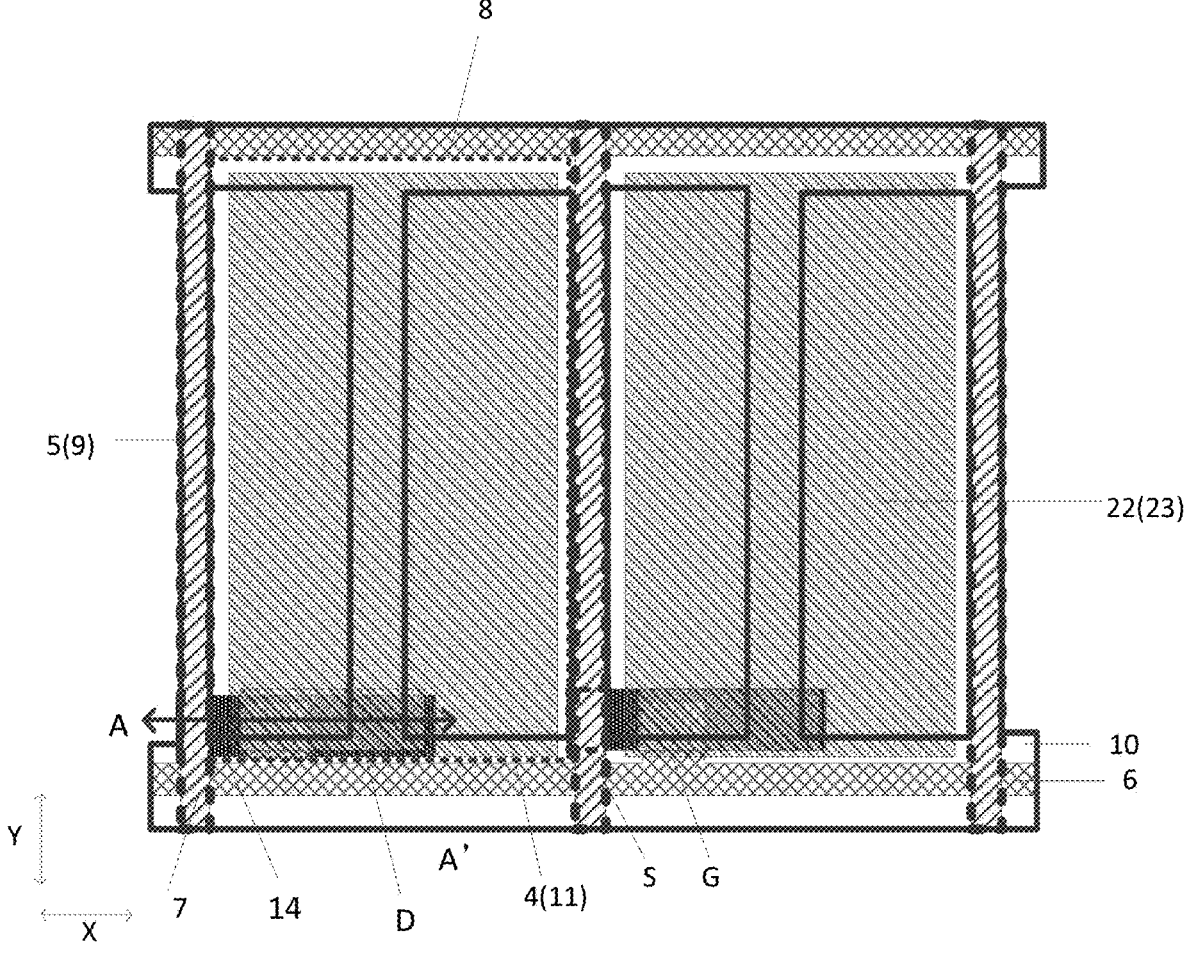
FIG. 1 is a schematic structural diagram of a display substrate according to an embodiment of the disclosure.
Figure 2:
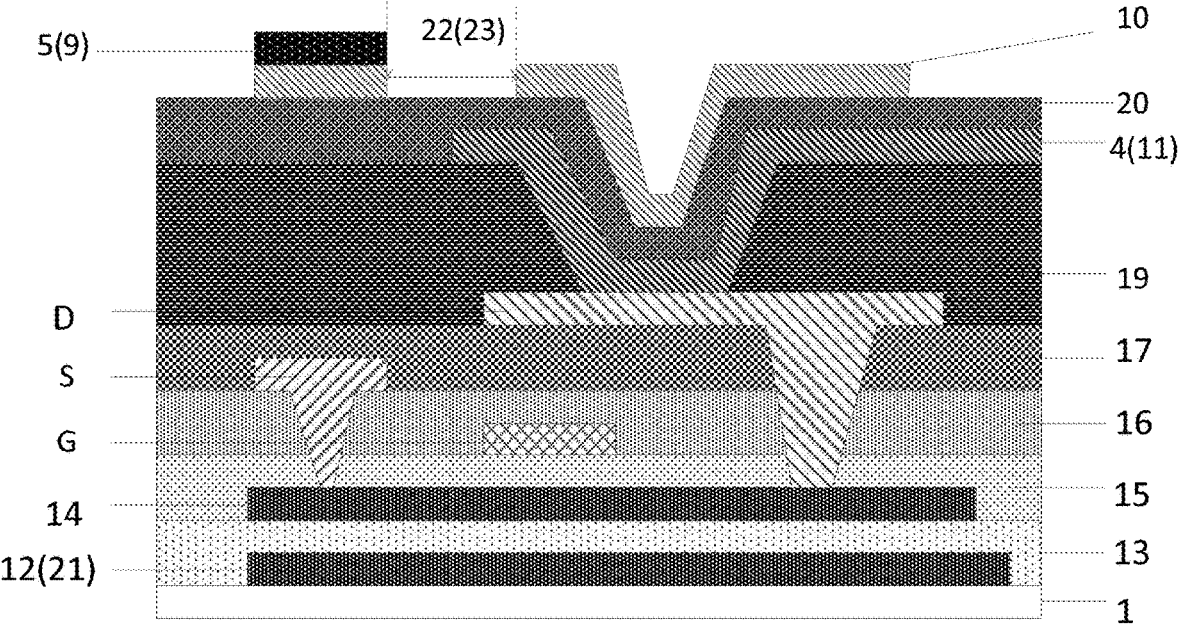
FIG. 2 is a cross-sectional view along AA' in FIG. 1 according to an embodiment of the disclosure.

Embodiments of the disclosure provide a display substrate. As shown in FIGS. 1 and 2, the display substrate includes:

a first base substrate 1;

a plurality of scanning lines 6 at a side of the first base substrate 1, extending in a first direction X and arranged in a second direction Y; here the first direction X intersects with the second direction Y;

a plurality of data lines 7 at the same side of the first base substrate 1 as the scanning lines 6 and in a different layer from the scanning lines 6, extending in the second direction Y and arranged in the first direction X; here the plurality of scanning lines 6 and the plurality of data lines 7 define a plurality of sub-pixels 8;

a common electrode layer 10 at a side of the scanning lines 6 and the data lines 7 facing away from the first base substrate 1; and a first light shielding layer 5 in contact with the common electrode layer 10, including a plurality of first light shielding portions 9 extending in the second direction Y; here the first light shielding portions 9 are in areas between the sub-pixels 8 adjacent in the first direction X.

In the display substrate provided by the embodiments of the disclosure, the first light shielding portions are provided in the areas between the sub-pixels adjacent in the first direction, so that the first light shielding portions can block the light leakage between the adjacent sub-pixels and avoid the crosstalk between the sub-pixels adjacent in the first direction, thus improving the display effect and enhancing the user experience.

It should be noted that the first direction X is perpendicular to the second direction Y as an example in FIG. 1. FIG. 2 is a cross-sectional view along AA' in FIG. 1.

It should be noted that, in order to clearly illustrate the relationship among the orthographic projections of the film layers in the display substrate, the pattern of the first light shielding layer and the pattern of the common electrode layer are not filled for illustration in FIG. 1. In FIG. 1, the areas enclosed by dotted lines represent the pattern of the first light shielding portions 9, and the area enclosed by the solid lines represents the pattern of the common electrode layer 10.

In some embodiments, the display substrate has a pixel density (PPI) range greater than or equal to 800.

That is, the display substrate provided by the embodiments of the disclosure may be applied to a display panel with high PPI. The PPI of the display substrate may be, for example, 800PPI to 1700PPI It should be noted that the display substrate provided by the embodiments of the disclosure may be applied to a liquid crystal display panel. The liquid crystal display panel further includes: an opposite substrate arranged opposite to the display substrate. The opposite substrate includes, for example, a second base substrate, a second light shielding layer and color filters at a side of the second base substrate facing the display substrate. The second light shielding layer has opening areas corresponding to the sub-pixels one by one, and the color filters are in the opening areas. In some implementations, the display substrate and the opposite substrate are aligned using a box aligning process, but the process condition may cause alignment deviation between the display substrate and the opposite substrate. For the display panel with high PPI, the pixel pitch in the first direction is usually small, and the distance between sub-pixels is small. When the alignment deviation occurs between the display substrate and the opposite substrate, the second light shielding layer cannot effectively block the light leakage between adjacent sub-pixels, easily leading to color cross in the display product. In the display substrate provided by the embodiments of the disclosure, since the first light shielding portions are provided between the sub-pixels adjacent in the first direction, the first light shielding portions can still block the light leakage between the adjacent sub-pixels even if the alignment deviation occurs between the display substrate and the opposite substrate, avoiding the crosstalk between the sub-pixels adjacent in the first direction X.

Figure 3:
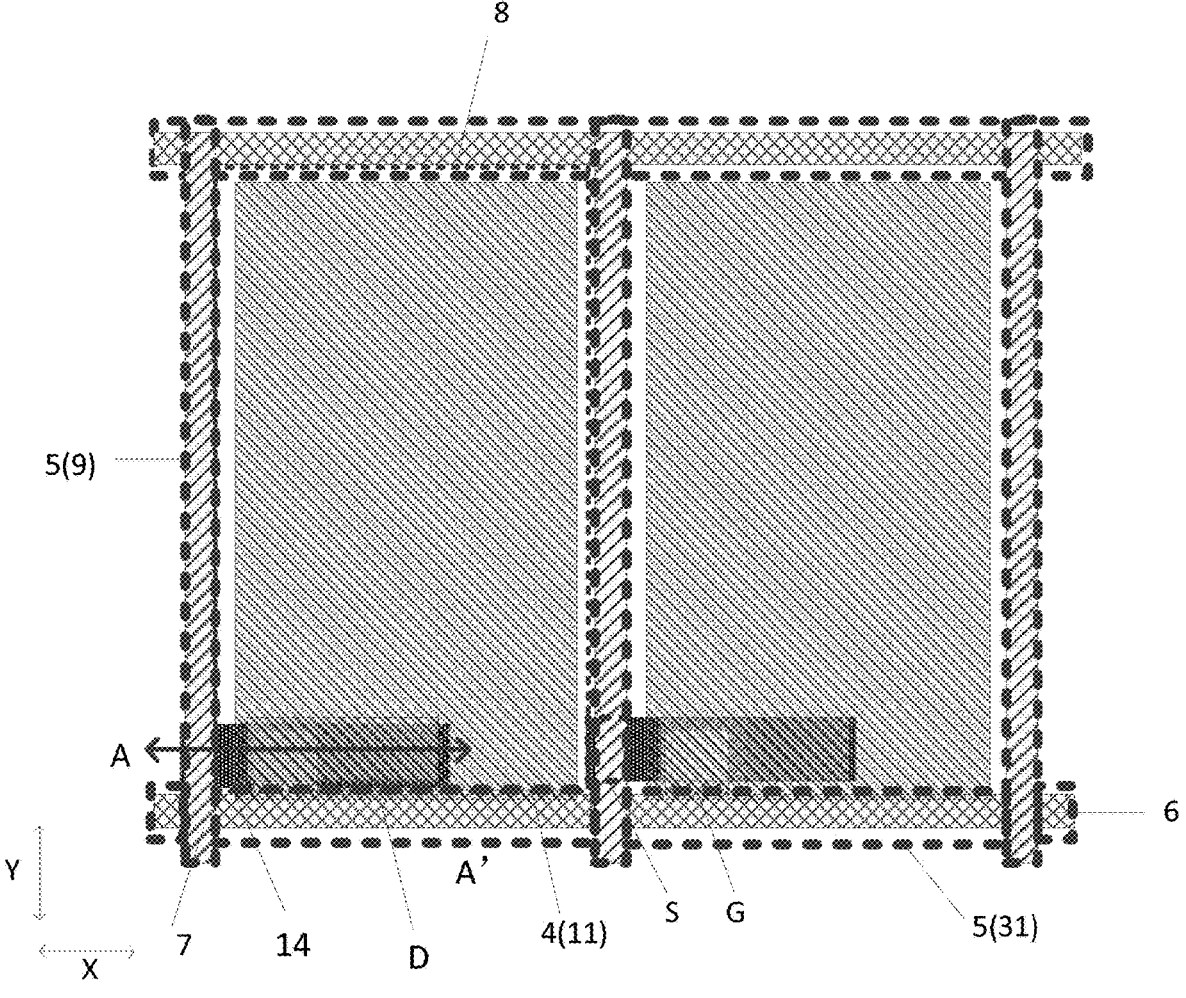
FIG. 3 is a schematic structural diagram of another display substrate according to an embodiment of the disclosure.

In some embodiments, as shown in FIG. 3, the first light shielding layer 5 further includes a plurality of second light shielding portions 31 extending in the first direction X. The second light shielding portions 31 are between the sub-pixels 8 adjacent in the second direction Y. That is, the light shielding portions may also be provided between the sub-pixels adjacent in the second direction. In some implementations, when the alignment deviation between the display substrate and the opposite substrate easily causes the light leakage between the sub-pixels adjacent in the second direction, the second light shielding portions are provided between the sub-pixels adjacent in the second direction, to avoid the crosstalk between the sub-pixels adjacent in the second direction.

It should be noted that the common electrode layer is not shown in FIG. 3. In order to clearly illustrate the relationship among the orthographic projections of the film layers in the display substrate, the areas enclosed by dotted lines in FIG. 3 represent the patterns of the first light shielding portions 9 and the second light shielding portions 31.

In some implementations, as shown in FIG. 3, the first light shielding portions 9 may be connected to the second light shielding portions 31. For example, the first light shielding portions and the second light shielding portions are integrally connected.

Alternatively, in some implementations, the first light shielding portions 9 may be disconnected from the second light shielding portions 31.

In some embodiments, the material of the first light shielding layer includes light shielding metal.

In some implementations, the common electrode layer is arranged on the entire surface, that is, the areas of the common electrode layer corresponding to the sub-pixels are integrally connected. Therefore, even if the common electrode layer is in contact with the first light shielding layer, there will be no problem of electrode short circuit between different sub-pixels, so there is no need to arrange an insulating layer between the first light shielding layer and the common electrode layer, avoiding the increase in the thickness of the display substrate and the increase in the manufacturing process of the display substrate while the first light shielding layer blocks the light leakage between adjacent sub-pixels.

In some embodiments, material of the first light shielding layer includes molybdenum.

In some embodiments, as shown in FIG. 1 and FIG. 2, the display substrate further includes:

a pixel electrode layer 4 between the common electrode layer 10 and the data lines 7.

orthographic projections of the first light shielding portions 9 on the first base substrate 1 do not overlap with an orthographic projection of the pixel electrode layer 4 on the first base substrate 1.

In some implementations, as shown in FIG. 1 and FIG. 2, the pixel electrode layer 4 includes a plurality of pixel electrodes 11. The pixel electrodes 11 correspond to the sub-pixels one by one. The orthographic projections of the pixel electrodes 11 on the first base substrate 1 fall into the sub-pixels 8.

In some implementations, for the display substrate with high PPI, due to the small pixel pitch, in order to ensure the aperture ratio of the sub-pixel, the distance between adjacent sub-pixels in the first direction is relatively small. Therefore, the distance between adjacent pixel electrodes in the first direction is relatively small. In the display substrate provided by the embodiments of the disclosure, the first light shielding layer and the pixel electrodes are in different film layers, avoiding the pixel electrodes from being short-circuited due to the case of the first light shielding layer being in the same layer as the pixel electrodes, while blocking the light leakage between adjacent sub-pixels.

In some embodiments, when the first light shielding layer further includes the second light shielding portions, the orthographic projections of the second light shielding portions on the first base substrate has an overlapping area with the orthographic projection of the pixel electrode layer on the first base substrate.

In some implementations, both the pixel electrode layer and the common electrode layer are transparent electrode layers. The material of the transparent electrode layer includes, for example, Indium Tin Oxide (ITO).

In the display substrate provided by the embodiments of the disclosure, the common electrode layer is at a side of the pixel electrode layer facing away from the first substrate, thereby improving the transmittance of the display substrate.

In some embodiments, as shown in FIG. 1, the orthographic projections of the data lines 7 on the first base substrate overlap with the orthographic projections of the first light shielding portions 9 on the first base substrate.

In some embodiments, as shown in FIG. 1, the orthographic projections of the data lines 7 on the first substrate are within the orthographic projections of the first light shielding portions 9 on the first substrate. That is, the first light shielding portions block the data lines.

In some embodiments, as shown in FIGS. 1, 2, 4 and 5, the orthographic projection of the common electrode layer 10 on the first base substrate 1 covers the orthographic projections of the first light shielding portions 9 on first base substrate 1.

Figure 4:
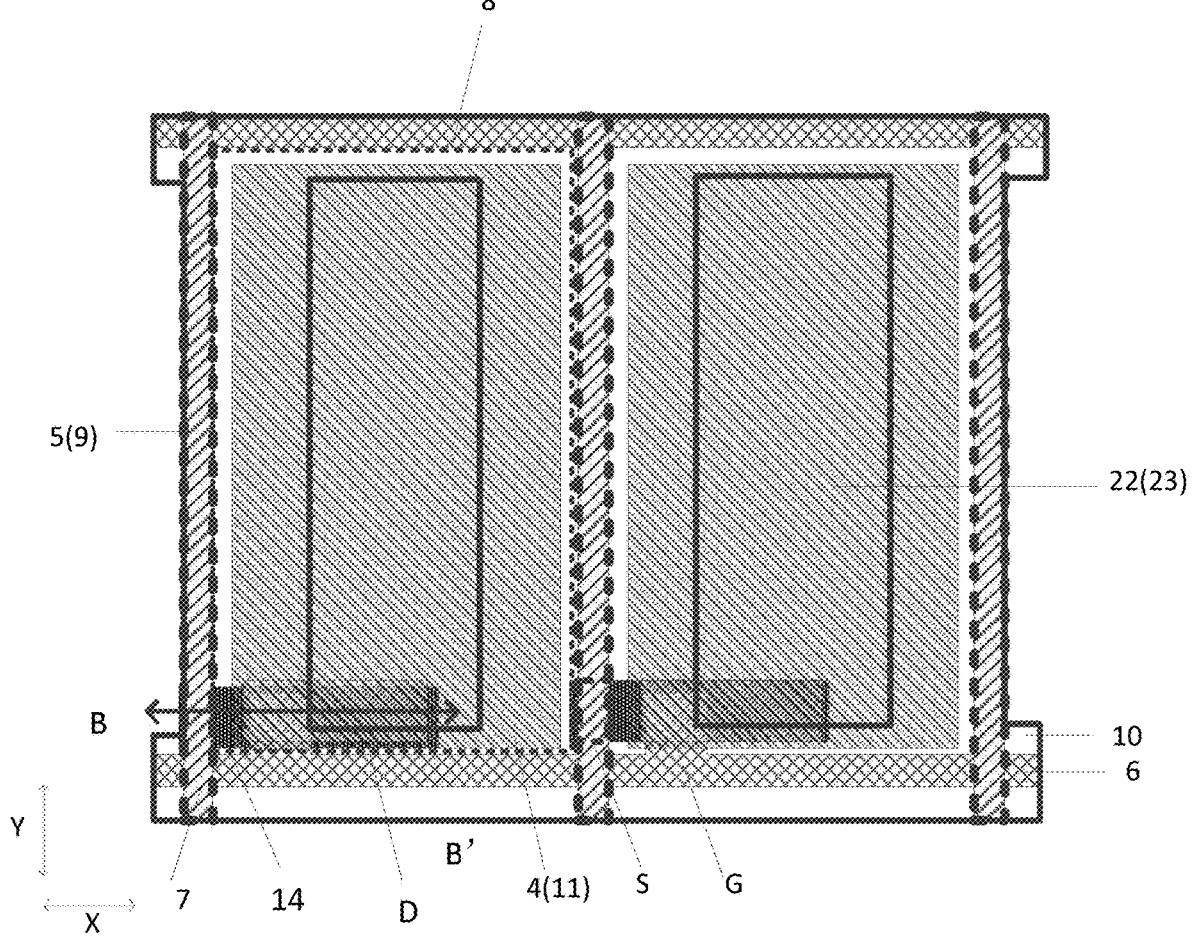
FIG. 4 is a schematic structural diagram of yet another display substrate according to an embodiment of the disclosure.
Figure 5:
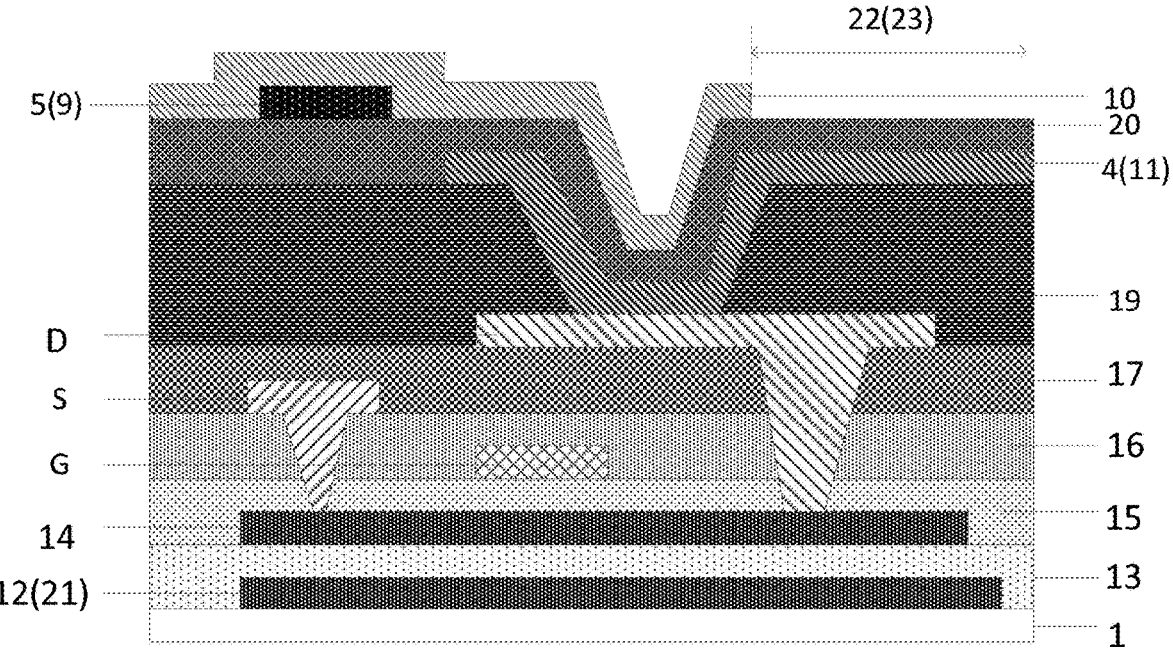
FIG. 5 is a cross-sectional view along BB' in FIG. 4 according to an embodiment of the disclosure.

It should be noted that FIG. 5 may be, for example, a cross-sectional view along BB' in FIG. 4.

In some embodiments, as shown in FIG. 2, the first light shielding portions 9 are at a side of the common electrode layer 10 facing away from the first base substrate 1.

Alternatively, in some embodiments, as shown in FIG. 5, the common electrode layer 10 is at a side of the first light shielding portions 9 facing away from the first base substrate 1.

In some embodiments, as shown in FIGS. 1, 2, 4 and 5, the common electrode layer 10 includes: groove groups 22 corresponding to the sub-pixels 8 one by one. The groove group 22 includes at least one groove 23 extending in the second direction Y and penetrating through the thickness of the common electrode layer 10.

The orthographic projections of the first light shielding portions 9 on the first base substrate 1 do not overlap with the orthographic projections of the grooves 23 on the first base substrate 1.

In some embodiments, as shown in FIGS. 1 and 2, the first light shielding portions 9 are at a side of the common electrode layer 10 facing away from the first base substrate 1, and the orthographic projection of the common electrode layer 10 on the first base substrate 1 and the orthographic projection of the first light shielding portion 9 on the first base substrate 1 have a substantially overlapping area.

It should be noted that the fact that the orthographic projection of the common electrode layer on the first base substrate and the orthographic projection of the first light shielding portion on the first base substrate have a substantially overlapping area means that there may be a non-overlapping part between the orthographic projection of the common electrode layer on the first base substrate and the orthographic projections of the first light shielding portions on the first base substrate within a reasonable process error range.

In some embodiments, as shown in FIG. 1, the groove group 22 includes a plurality of grooves 23. In FIG. 1, the groove group 22 includes two grooves 23 as an example for illustration.

In some implementations, when the groove group includes a plurality of grooves, the width between the grooves that are adjacent in the first direction and respectively located in two adjacent sub-pixels is relatively small. The width between the grooves that are adjacent in the first direction and respectively located in two adjacent sub-pixels may be equal to the width of the first light shielding portion. When the first light shielding portions are located at a side of the common electrode layer facing away from the first base substrate, in the preparation process of the display substrate, the common electrode layer and the first light shielding layer may be formed sequentially, and then the patterning process may be performed, so that the self-alignment between the first light shielding layer and the common electrode layer can be realized, and there is no alignment deviation between the first light shielding layer and the common electrode layer. The blocking effect of the first light shielding layer can be improved, and the problem of inconsistent transmittance caused by the uneven opening areas corresponding to the common electrode grooves in adjacent sub-pixels can also be avoided, thus improving the optical effect of the display substrate and improving the display effect.

Of course, in some implementations, when the groove group includes a plurality of grooves, the common electrode layer may also be located at a side of the first light shielding portions facing away from the first base substrate.

In some embodiments, as shown in FIGS. 4 and 5, when the common electrode layer 10 is at a side of the first light shielding portions 9 facing away from the first base substrate 1, the orthographic projections of the first light shielding portions 9 on the first base substrate 1 are within the orthographic projection of the common electrode layer 10 on the first base substrate 1, and the common electrode layer 10 covers lateral surfaces of the first light shielding portions.

In some embodiments, as shown in FIG. 4, the groove group 22 includes only one groove 23.

In the display substrate provided by the embodiments of the disclosure, when the groove group includes only one groove, the width between adjacent grooves in the first direction is generally greater than the width between adjacent sub-pixels, that is, the width between adjacent grooves in the first direction is generally greater than the width of the first light shielding portion. In this case, the common electrode layer is located at a side of the first light shielding portions facing away from the first base substrate, so that the common electrode layer covers the first light shielding portions and the lateral surfaces thereof, and the patterning process of the common electrode layer will not cause damage to the pattern of the first light shielding layer.

In some embodiments, a thickness of the first light shielding layer is greater than or equal to 300 angstroms and less than or equal to 1000 angstroms.

In some embodiments, as shown in FIGS. 1 to 4, the data lines 7 are at a side of the scanning lines 6 facing away from the first base substrate 1.

The sub-pixel 8 includes a thin film transistor. The gate electrode G of the thin film transistor and the scanning line 6 are arranged in the same layer and are electrically connected. The source electrode S of the thin film transistor and the data line 7 are arranged in the same layer and are electrically connected. The drain electrode D of the thin film transistor is at a side of the source electrode S facing away from the first base substrate 1. The drain electrode D of the thin film transistor is electrically connected to the pixel electrode 11.

In the display substrate provided by the embodiments of the disclosure, the drain electrode of the thin film transistor and the data line are arranged in different layers. In this way, even if the distance between the edge of the orthographic projection of the drain electrode on the first base substrate and the edge of the orthographic projection of the data line on the first base substrate is reduced, there will be no short circuit between the drain electrode of the thin film transistor and the data line, thus simplifying the design difficulty of the layout of the display substrate.

In some implementations, the thin film transistor may have a bottom-gate structure or a top-gate structure. In the following, a thin film transistor with a top-gate structure is taken as an example for illustration. In some embodiments, as shown in FIGS. 2 and 5, the display panel further includes: a third light shielding layer 12 between the first base substrate 1 and the gate electrode G, a buffer layer 13 between the buffer layer 13 and the gate electrode G, an active layer 14 between the buffer layer 13 and the gate electrode G, a gate insulating layer 15 between the active layer 14 and the gate electrode G, a first interlayer insulating layer 16 between the gate electrode G and the source electrode S, a second interlayer insulating layer 17 between the source electrode S and the drain electrode D, a planarization layer 19 between the drain electrode D and the pixel electrode layer 4, and a passivation layer 20 between the pixel electrode layer 4 and the common electrode layer 10. The third light shielding layer 12 includes a plurality of third light shielding portions 21. The orthographic projection of the active layer 14 on the first base substrate 1 is within the orthographic projections of the third light shielding portions 21 on the first base substrate. The source electrode S is in contact with the active layer 14 through a via hole penetrating through the first interlayer insulating layer 16 and the gate insulating layer 15. The drain electrode D is in contact with the active layer 14 through a via hole penetrating through the second interlayer insulating layer 17, the first interlayer insulating layer 16 and the gate insulation layer 15. The pixel electrode 11 is in contact with the drain electrode D through a via hole penetrating through the planarization layer 19.

Figure 6:
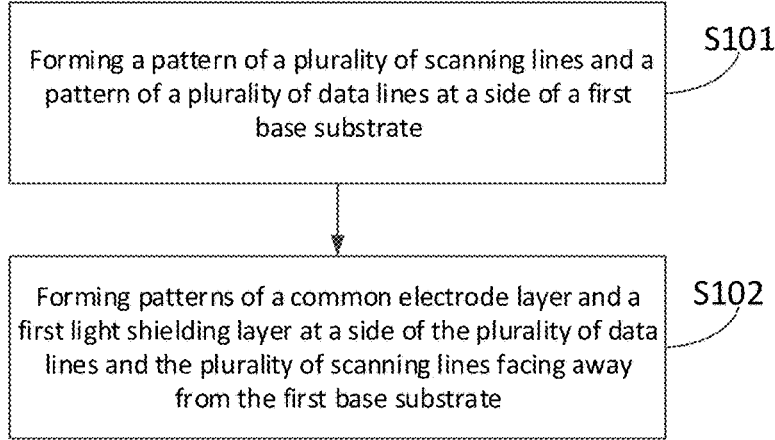
FIG. 6 is a schematic flow chart of a manufacturing method for a display substrate according to an embodiment of the disclosure.

Based on the same inventive concept, embodiments of the disclosure further provide a manufacturing method for a display substrate, as shown in FIG. 6, including:

S101: forming a pattern of a plurality of scanning lines and a pattern of a plurality of data lines at a side of a first base substrate; here the plurality of scanning lines extend in a first direction and are arranged in a second direction; the plurality of data lines extend in the second direction and are arranged in the first direction; the first direction intersects with the second direction; the plurality of scanning lines and the plurality of data lines define a plurality of sub-pixels.

S102: forming patterns of a common electrode layer and a first light shielding layer at a side of the plurality of data lines and the plurality of scanning lines facing away from the first base substrate; here the first light shielding layer is in contact with the common electrode layer, the first light shielding layer includes a plurality of first light shielding portions extending in the second direction, and the first light shielding portions are located in areas between the sub-pixels adjacent in the first direction.

In some embodiments, before the step S101 of forming the pattern of the plurality of scanning lines and the pattern of the plurality of data lines at the side of the first base substrate, the method further includes:

forming a pattern of a third light shielding layer on the first base substrate;

forming a pattern of a buffer layer at a side of the third light shielding layer facing away from the first base substrate;

forming a pattern of an active layer at a side of the buffer layer facing away from the third light shielding layer; and forming a pattern of a gate insulating layer at a side of the active layer facing away from the third light shielding layer.

The step S101 of forming the pattern of the plurality of scanning lines and the pattern of the plurality of data lines at the side of the first base substrate, includes:

forming a first conductive layer at a side of the gate insulating layer facing away from the active layer, and forming the pattern of the scanning lines and a pattern of a gate electrode of a thin film transistor by a patterning process;

forming a pattern of a first interlayer insulating layer at a side of the first conductive layer facing away from the active layer; and forming a second conductive layer at a side of the first interlayer insulating layer facing away from the first conductive layer, and forming the pattern of the data lines and a pattern of a source electrode of the thin film transistor by a patterning process.

In some embodiments, after forming the pattern of the plurality of scanning lines and the pattern of the plurality of data lines at the side of the first base substrate, and before forming the patterns of the common electrode layer and the first light shielding layer at the side of the plurality of data lines and the plurality of scanning lines facing away from the first base substrate, the method further includes:

forming a pattern of a second interlayer insulating layer at a side of the second conductive layer facing away from the first interlayer insulating layer;

forming a third conductive layer at a side of the second interlayer insulating layer facing away from the second conductive layer, and forming a pattern of a drain electrode of the thin film transistor by a patterning process;

forming a pattern of a planarization layer at a side of the third conductive layer facing away from the second interlayer insulating layer;

forming a pixel electrode layer at a side of the planarization layer facing away from the third conductive layer, and forming a pattern of a pixel electrode by a patterning process; and forming a pattern of a passivation layer at a side of the pixel electrode facing away from the planarization layer.

In some embodiments, the step S102 of forming the patterns of the common electrode layer and the first light shielding layer at the side of the plurality of data lines and the plurality of scanning lines facing away from the first base substrate, includes:

S1021: forming the common electrode layer at the side of the plurality of data lines and the plurality of scanning lines facing away from the first base substrate.

S1022: forming the first light shielding layer at a side of the common electrode layer facing away from the first base substrate.

S1023: processing the first light shielding layer and the common electrode layer by a patterning process to form a pattern of the first light shielding layer and a pattern of the common electrode layer.

In some implementations, the step of forming the common electrode layer at the side of the plurality of data lines and the plurality of scanning lines facing away from the first base substrate, includes:

forming the common electrode layer at a side of the passivation layer facing away from the pixel electrode layer.

Figure 7:
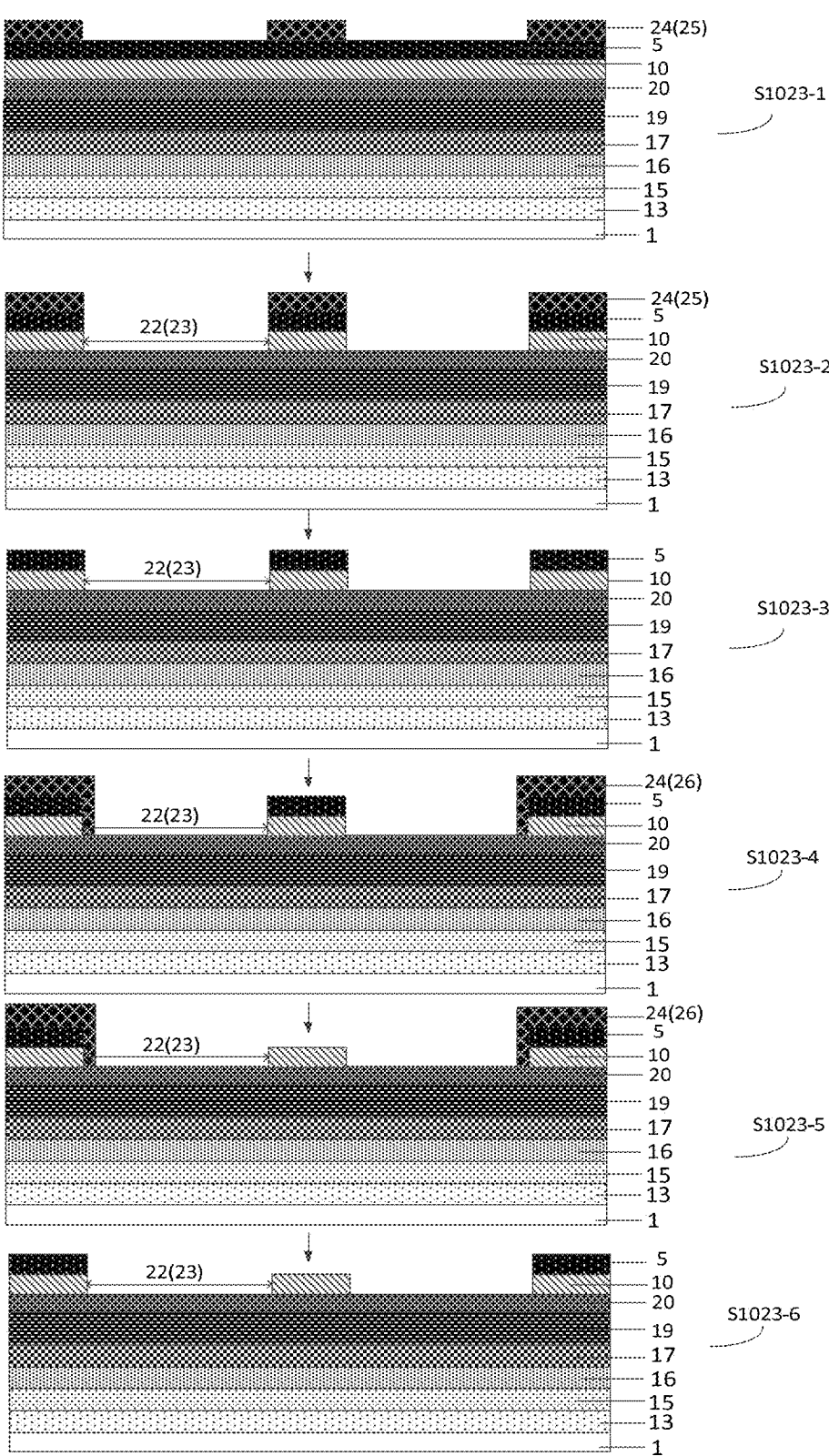
FIG. 7 is a schematic flow chart of another manufacturing method for a display substrate according to an embodiment of the disclosure.

In some embodiments, as shown in FIG. 7, the step S1023 of processing the first light shielding layer and the common electrode layer by the patterning process to form the pattern of the first light shielding layer and the pattern of the common electrode layer, includes:

S1023-1: coating photoresist 24 at a side of the first light shielding layer 5 facing away from the common electrode layer 10, and forming a first pattern 25 by exposure and development processes.

S1023-2: forming a second pattern corresponding to the first pattern 25 on the first light shielding layer 5 and the common electrode layer 10 by an etching process.

S1023-3: peeling off the photoresist 24, and annealing the common electrode layer 10 to crystallize the common electrode layer 10.

S1023-4: forming photoresist 24 at a side of the first light shielding layer 5 facing away from the common electrode layer 10, and forming a third pattern 26 by exposure and development processes; here the third pattern 26 covers a part of the first light shielding layer 5.

S1023-5: removing the first light shielding layer 5 that is not covered by the third pattern 26 by an etching process.

S1023-6: removing the photoresist 24.

In the manufacturing method for the display substrate provided by the embodiments of the disclosure, the common electrode layer and the first light shielding layer are formed sequentially and then the patterning process is performed, so that the self-alignment between the first light shielding layer and the common electrode layer can be realized, and there is no alignment deviation between the first light shielding layer and the common electrode layer. The blocking effect of the first light shielding layer can be improved, and the problem of inconsistent transmittance caused by the uneven opening areas corresponding to the common electrode grooves in adjacent sub-pixels can also be avoided, thus improving the optical effect of the display substrate and improving the display effect. Moreover, after the second pattern is formed and the photoresist is peeled off, the common electrode layer is annealed to crystallize the common electrode layer. In this way, when the first light shielding layer that is not covered by the third pattern is subsequently removed by the etching process, the crystallized common electrode layer will not be removed, thus avoiding damage to the common electrode layer.

It should be noted that, in some implementations, when the material of the common electrode layer includes ITO and the material of the first light shielding layer includes molybdenum, the etching process is, for example, a wet etching process, and the conventional etching solutions of ITO and molybdenum both contain nitric acid. The first light shielding layer and the common electrode layer can be etched simultaneously using the conventional etching solution of ITO. The conventional etching solution of ITO includes nitric acid ($HNO_3$), acetic acid ($CH_3COOH$), or phosphoric acid ($H_3PO_4$). After the common electrode layer is annealed, the conventional etching solution of molybdenum can be used to remove the first light shielding layer that is not covered by the third pattern. The crystallized common electrode layer will not be etched by the conventional etching solution of molybdenum. The conventional etching solution of molybdenum includes $HNO_3$ or sulfuric acid ($H_2SO_4$).

It should be noted that, as shown in FIG. 7, the patterning process is performed on the common electrode layer 10 to form the grooves 23. In FIG. 7, the groove group 22 includes two grooves 23 as an example for illustration.

In some implementations, as shown in FIG. 7, the third pattern 26 formed in step S1023-4 also covers the lateral surface of the first light shielding layer 5, thereby avoiding the lateral surface of the first light shielding layer that needs to be retained from being etched.

In some embodiments, the step S102 of forming the patterns of the common electrode layer and the first light shielding layer at the side of the plurality of data lines and the plurality of scanning lines facing away from the first base substrate, includes:

S1021': forming the first light shielding layer at the side of the plurality of data lines and the plurality of scanning lines facing away from the first base substrate, and forming a pattern of the first light shielding portions by a patterning process.

S1022': forming the common electrode layer at a side of the first light shielding layer facing away from the plurality of data lines and the plurality of scanning lines, and forming a pattern of the common electrode layer by a patterning process.

Figure 8:
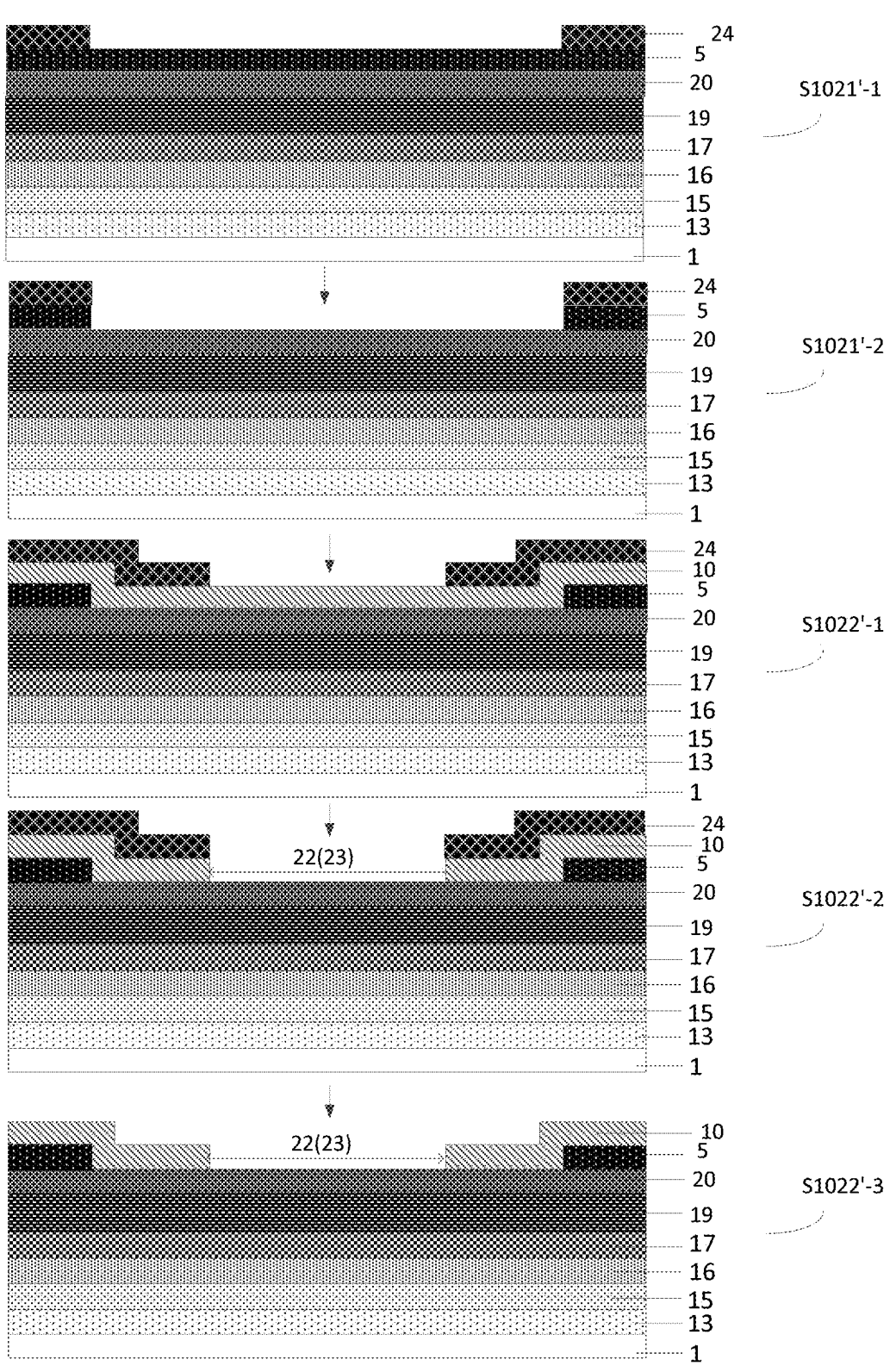
FIG. 8 is a schematic flow chart of yet another manufacturing method for a display substrate according to an embodiment of the disclosure.

In some implementations, as shown in FIG. 8, the step of forming the first light shielding layer at the side of the plurality of data lines and the plurality of scanning lines facing away from the first base substrate, and forming the pattern of the first light shielding portions by the patterning process, includes:

S1021'-1: forming the first light shielding layer 5 at a side of the passivation layer 20 facing away from the pixel electrode layer, forming the photoresist 24 at a side of the first light shielding layer 5 facing away from the passivation layer 20, and forming the pattern of the photoresist 24 by exposure and development processes.

S1021'-2: etching the first light shielding layer 5 by the etching process, to form the pattern of the first light shielding portions 9.

S1021'-3: peeling off the photoresist 24.

The step of forming the common electrode layer at the side of the first light shielding layer facing away from the plurality of data lines and the plurality of scanning lines, and forming the pattern of the common electrode layer by the patterning process, includes:

S1022'-1: forming the common electrode layer 10 at a side of the first light shielding layer 5 facing away from the passivation layer 20, forming the photoresist 24 at a side of the common electrode layer 10 facing away from the first light shielding layer 5; and forming the pattern of the photoresist 24 by exposure and development processes.

S1022'-2: etching the common electrode layer 10 by the etching process, to form the pattern of the common electrode layer 10.

S1022'-3: peeling off the photoresist 24.

It should be noted that, as shown in FIG. 8, the patterning process is performed on the common electrode layer 10 to form the groove 23. In FIG. 8, the groove group 22 includes one groove 23 as an example for illustration.

In the manufacturing method for the display substrate provided by embodiments of the disclosure, when the width between adjacent grooves in the first direction is greater than the width of the first light shielding portion, the pattern of the first light shielding portions is firstly formed, and then the pattern of the common electrode layer is formed. The common electrode layer covers the first light shielding portions and the lateral surfaces thereof, and the patterning process of the common electrode layer will not cause damage to the pattern of the first light shielding layer.

Figure 9:
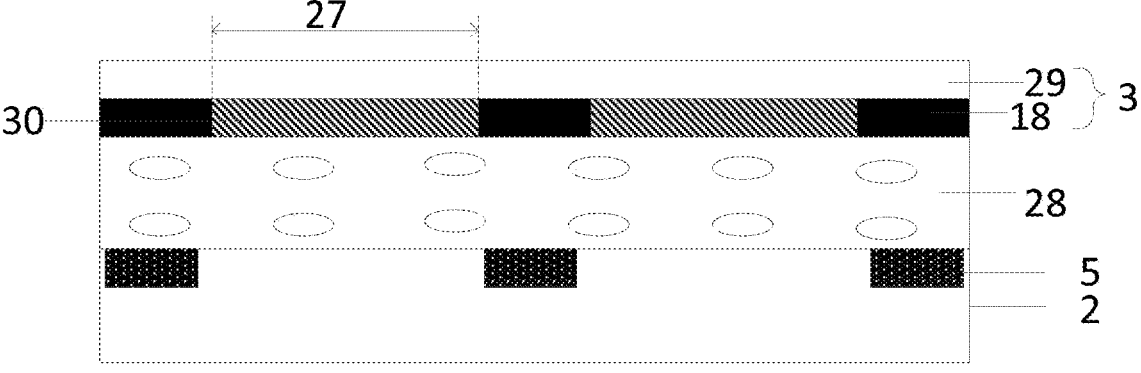
FIG. 9 is a schematic structural diagram of a display panel according to an embodiment of the disclosure.

Embodiments of the disclosure provide a display panel, as shown in FIG. 9, including:

the display substrate 2 provided by the embodiments of the disclosure;

an opposite substrate 3 arranged opposite to the display substrate 2, including a second light shielding layer 18; here the second light shielding layer 18 includes a plurality of opening areas 27, and an orthographic projection of the first light shielding layer 9 on the first base substrate is within an orthographic projection of the second light shielding layer 18 on the first base substrate; and a liquid crystal layer 28 between the opposite substrate 3 and the display substrate 2.

In the display substrate included in the display panel provided by the embodiments of the disclosure, the first light shielding portions are provided in the areas between the sub-pixels adjacent in the first direction. The opposite substrate includes the second light shielding layer. The first light shielding layer and the second light shielding layer implement double shielding, and can improve the shielding effect between sub-pixels and avoid the crosstalk between the sub-pixels adjacent in the first direction, thus improving display effect and enhancing the user experience.

In some embodiments, as shown in FIG. 9, the opposite substrate 3 further includes a second base substrate 29 and color filters 30. The second light shielding layer 18 is at a side of the second base substrate 29 facing the liquid crystal layer 28, and the color filters 30 are in the opening areas 27.

In some implementations, the opening areas of the second light shielding layer correspond to the sub-pixels one by one, and the opening areas of the second light shielding layer are the opening areas of the sub-pixels. The sub-pixels include, for example, red sub-pixels, blue sub-pixels, and green sub-pixels. The color filters include red color filters in the red sub-pixels, blue color filters in the blue sub-pixels, and green color filters in the green sub-pixels.

In the following, the groove group in the common electrode layer includes only one groove as an example, to compare the cross-color situations of the display panel provided by the embodiments of the disclosure and the display panel with no first light shielding layer provided in the display substrate in the related art. In the first direction, the pixel pitch is 6.0 microns, the width of the data line is 1.4 microns, the width of the second light shielding layer is 2.5 microns, the width between adjacent grooves is 3.5 microns, and the width of the pixel electrode is 3.5 microns. The color difference comparison between the display panel a1 provided with the first light shielding layer and the display panel a2 provided with no first light shielding layer is shown in Table 1. The cross-color labeling of the display product generally indicates that the color difference Δuv is less than 0.015. As can be seen from Table 1, each sub-pixel in the display panel a2 with no first light shielding layer provided in the display substrate in the related art does not meet the cross-color standard, and each sub-pixel in the display panel a1 provided with the first light shielding layer meets the cross-color standard. The display panel provided by the embodiments of the disclosure can greatly improve the cross-color defect of the display panel and improve the display effect.

TABLE 1

| Sub-pixel | Color difference of display panel a1 | Color difference of display panel a2 |
| --- | --- | --- |
| Red sub-pixel | 0.014 | 0.033 |
| Green sub-pixel | 0.002 | 0.035 |
| Blue sub-pixel | 0.006 | 0.016 |

Embodiments of the disclosure provide a display apparatus, including the display panel provided by the embodiments of the disclosure.

In some embodiments, the display apparatus further includes a backlight module. The display panel is on the light emitting side of the backlight module.

The display apparatus according to the embodiments of the disclosure is a mobile phone, a tablet, a television, a display, a laptop, a digital photo frame, a navigator, or any other product or component with display function. All of other indispensable components of the display apparatus should be understood by those ordinary skilled in the art to be included, and will be omitted here and should not be considered as limitations on the disclosure. The implementations of this display apparatus can refer to the above embodiments of the display substrate and the display panel, and the repeated description thereof will be omitted here.

To sum up, in the display substrate and the manufacturing method therefor, the display panel and the display apparatus provided by the embodiments of the disclosure, the first light shielding portions are provided in the areas between the sub-pixels adjacent in the first direction, so that the first light shielding portions can block the light leakage between the adjacent sub-pixels and avoid the crosstalk between the sub-pixels adjacent in the first direction, thus improving the display effect and enhancing the user experience.

Although the preferred embodiments of the invention have been described, those skilled in the art can make additional alterations and modifications to these embodiments once they learn about the basic creative concepts. Thus the attached claims are intended to be interpreted to include the preferred embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. A display substrate, comprising:
a first base substrate;
a plurality of scanning lines at a side of the first base substrate, extending in a first direction and arranged in a second direction; wherein the first direction intersects with the second direction;
a plurality of data lines at a side of the first base substrate and in a different layer from the scanning lines, extending in the second direction and arranged in the first direction; wherein the plurality of scanning lines and the plurality of data lines define a plurality of sub-pixels;
a common electrode layer at a side of the scanning lines and the data lines facing away from the first base substrate; and
a first light shielding layer in contact with the common electrode layer, comprising a plurality of first light shielding portions extending in the second direction; wherein the first light shielding portions are in areas between the sub-pixels adjacent in the first direction;
    wherein the common electrode layer is at a side of the first light shielding portions facing away from the first base substrate; and
    orthographic projections of the first light shielding portions on the first base substrate are within an orthographic projection of the common electrode layer on the first base substrate, and the common electrode layer covers lateral surfaces of the first light shielding portions.

2. The display substrate according to claim 1, wherein orthographic projections of the data lines on the first base substrate are within orthographic projections of the first light shielding portions on the first base substrate.

3. The display substrate according to claim 1, wherein the common electrode layer comprises: groove groups corresponding to the sub-pixels one by one; and the groove group comprises at least one groove extending in the second direction and penetrating through the common electrode layer; and
    the orthographic projections of the first light shielding portions on the first base substrate do not overlap with orthographic projections of the grooves on the first base substrate.

4. The display substrate according to claim 3, wherein the groove group comprises a plurality of grooves.

5. The display substrate according to claim 3, wherein the groove group comprises only one groove.

6. The display substrate according to claim 1, wherein a thickness of the first light shielding layer is greater than or equal to 300 angstroms and less than or equal to 1000 angstroms.

7. The display substrate according to claim 1, wherein material of the first light shielding layer comprises molybdenum.

8. The display substrate according to claim 1, wherein the first light shielding layer further comprises a plurality of second light shielding portions extending in the first direction; and the second light shielding portions are between the sub-pixels adjacent in the second direction.

9. The display substrate according to claim 1, further comprising:
a pixel electrode layer between the common electrode layer and the data lines; wherein orthographic projections of the first light shielding portions on the first base substrate do not overlap with an orthographic projection of the pixel electrode layer on the first base substrate.

10. The display substrate according to claim 1, wherein the data lines are at a side of the scanning lines facing away from the first base substrate; and
    the sub-pixel comprises a thin film transistor; a gate electrode of the thin film transistor is arranged in a layer same as the scanning line and is electrically connected to the scanning line; a source electrode of the thin film transistor is arranged in a layer same as the data line and is electrically connected to the data line; and a drain electrode of the thin film transistor is at a side of the source electrode facing away from the first base substrate.

11. A manufacturing method for a display substrate, comprising:
forming a pattern of a plurality of scanning lines at a side of a first base substrate and forming a pattern of a plurality of data lines at a side of a first base substrate; wherein the plurality of scanning lines extend in a first direction and are arranged in a second direction; the plurality of data lines extend in the second direction and are arranged in the first direction; the first direction intersects with the second direction; the plurality of scanning lines and the plurality of data lines define a plurality of sub-pixels; and
forming patterns of a common electrode layer and a first light shielding layer at a side of the plurality of data lines and the plurality of scanning lines facing away from the first base substrate; wherein the first light shielding layer is in contact with the common electrode layer, the first light shielding layer comprises a plurality of first light shielding portions extending in the second direction, and the first light shielding portions are in areas between the sub-pixels adjacent in the first direction;
    wherein the common electrode layer is at a side of the first light shielding portions facing away from the first base substrate; and orthographic projections of the first light shielding portions on the first base substrate are within an orthographic projection of the common electrode layer on the first base substrate, and the common electrode layer covers lateral surfaces of the first light shielding portions.

12. The method according to claim 11, wherein said forming the patterns of the common electrode layer and the first light shielding layer at the side of the plurality of data lines and the plurality of scanning lines facing away from the first base substrate, comprises:

forming the first light shielding layer at the side of the plurality of data lines and the plurality of scanning lines facing away from the first base substrate, and forming a pattern of the first light shielding portions by a patterning process; and forming the common electrode layer at a side of the first light shielding layer facing away from the plurality of data lines and the plurality of scanning lines, and forming a pattern of the common electrode layer by a patterning process.

13. A display panel, comprising:

the display substrate according to claim 1;

an opposite substrate arranged opposite to the display substrate, comprising a second light shielding layer; wherein the second light shielding layer comprises a plurality of opening areas, and an orthographic projection of the first light shielding layer on the first base substrate is within an orthographic projection of the second light shielding layer on the first base substrate; and a liquid crystal layer between the opposite substrate and the display substrate.

14. A display apparatus, comprising: the display panel according to claim 13.

* * * * *